United States Patent
Shitamitsu et al.

(10) Patent No.: US 7,004,279 B2
(45) Date of Patent: Feb. 28, 2006

(54) VEHICLE STEERING SYSTEM

(75) Inventors: Kiyotaka Shitamitsu, Zama (JP); Hitoshi Ono, Ebina (JP); Kazuo Hara, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/886,702

(22) Filed: Jul. 9, 2004

(65) Prior Publication Data

US 2005/0045413 A1 Mar. 3, 2005

(30) Foreign Application Priority Data

Aug. 28, 2003 (JP) ............... 2003-209393

(51) Int. Cl.
*B62D 5/00* (2006.01)
(52) U.S. Cl. .............. 180/402; 180/404; 180/405; 701/43
(58) Field of Classification Search ........... 180/402, 180/404, 405, 407, 446; 701/41, 43
See application file for complete search history.

(56) References Cited

U.S. PATENT DOCUMENTS

| | | | |
|---|---|---|---|
| 6,442,462 B1 | 8/2002 | Nishizaki et al. | |
| 6,547,031 B1 * | 4/2003 | Magnus | ............ 180/444 |
| 6,842,678 B1 * | 1/2005 | Husain et al. | ............ 701/41 |
| 6,929,086 B1 * | 8/2005 | Husain et al. | ............ 180/402 |
| 6,938,721 B1 * | 9/2005 | Ono et al. | ............ 180/402 |
| 2002/0092696 A1 | 7/2002 | Bohner et al. | |

FOREIGN PATENT DOCUMENTS

| | | |
|---|---|---|
| DE | 19838490 A1 | 12/1999 |
| DE | 10101827 A1 | 7/2002 |
| DE | 10135736 C1 | 4/2003 |
| JP | 2002-145098 A | 5/2002 |

* cited by examiner

Primary Examiner—Lesley D. Morris
Assistant Examiner—Matthew Luby
(74) Attorney, Agent, or Firm—Shinjyu Global IP Counselors, LLP

(57) ABSTRACT

A vehicle steering system is provided with a primary steering system, a backup steering system and a control system that switches from the primary steering system to the backup steering system when a defect is determined in the primary steering system such as a defeat in a steering reaction force actuator. The vehicle steering system has a pair of clutches that mechanically disconnect the steering wheel from the steerable vehicle wheels in normal situations, and connect them when the steering reaction force actuator is determined to be defective. The control system has a steering malfunction detection section that detects a malfunction in the steering reaction force actuator, and a steering control limiting section that limits the control commands to the steering gear unit actuator from when the steering reaction force actuator is determined to be malfunctioning to when both the clutches are connected.

12 Claims, 3 Drawing Sheets

VEHICLE STEERING SYSTEM

BACKGROUND OF THE INVENTION

1. Field of the Invention

The present invention generally relates to a vehicle steering system. The present invention more specifically relates a vehicle steering system having a mechanical steering system and a steer-by-wire steering system where the steer-by-wire steering system is connected in normal operating situations and selectively disconnected in defective situations.

2. Background Information

Recently, a vehicle steering system has been developed which is capable of varying a steering characteristic by varying the ratio between an amount of operation of an operating member (steering wheel) and an amount of turning of the vehicle steered wheels. Thus, movement of the operating member operates a steering actuator to transmit a steering force to the vehicle steered wheels in order to vary the turning angle. One example of this type of vehicle steering system is known as a so called steer-by-wire system. In a so called steer-by-wire system, the operating member (steering wheel) is not mechanically connected to the vehicle steered wheels normal operating situations. In a steer-by-wire system, the ratio between the amount of operation and the amount of steering is varied by controlling the steering actuator, without mechanically connecting the steering wheel to the vehicle steered wheels, when movement of a steering actuator is transmitted to the vehicle steered wheels in order to vary the steering angle through a steering gear unit actuator. For example, in a steer-by-wire type steering system, since the steering wheel is not normally connected mechanically to the vehicle steered wheels, a reaction force is applied to the steering wheel based on friction with the road surface such as steering resistance to provide the driver with a steering feeling similar to a mechanically connected steering system.

Some of the steer-by-wire type steering systems for vehicles that can freely set a reaction torque for a steering wheel and a turning angle for the vehicle steered wheels, it is known to provided a mechanical back-up mechanism, which uses a clutch to connect and disconnect the steering wheel to and from the vehicle steered wheels to maintain safety in case when there is a system defect occurring. One example of such a steer-by-wire type steering system is disclosed in U.S. Pat. No. 6,442,462 (also see, Japanese Laid-Open Patent Publication No. 2002-145098). In U.S. Pat. No. 6,442,462,the steering wheel and the vehicle steered wheels are disconnected in normal situations, and a steering reaction force actuator and a steering gear unit actuator are operated to provide a steering reaction force to the steering wheel and a turning force to the vehicle steered wheels. When one of these force actuators malfunctions, a clutch is brought into engagement to mechanically connect the steering wheel to the vehicle steered wheels and apply a steering assist force.

In view of the above, it will be apparent to those skilled in the art from this disclosure that there exists a need for an improved vehicle steering system. This invention addresses this need in the art as well as other needs, which will become apparent to those skilled in the art from this disclosure.

SUMMARY OF THE INVENTION

It has been discovered that in the above mentioned steering system disclosed U.S. Pat. No. 6,442,462, when a malfunction is detected in the steering reaction actuator that applies a reaction force for the steering wheel, the steering reaction actuator is stopped and the steering wheel that drivers started steering rotates freely until a clutch completes connection. However, the steering gear unit actuator is controlled based on changes of detected steering angle by the rotation of the steering wheel. Consequently, the driver may over steer the vehicle because the steering wheel turns more than the drivers thought it would. In other words, after a defect in the steering actuator is found, a transition period occurs until the clutch fully engages to mechanically connect the steering wheel to the vehicle steered wheels. During this transition period from when the steering reaction force actuator is detected as malfunctioning to when the clutch completes connection, the steering actuator control is conducted based on a detected steering angle by the normal mode.

The present invention was conceived to substantially avoid this kind of problem. Thus, one proposed object of the present invention is to provide a vehicle steering system that can make displacement of the vehicle steered wheels small and prevent the vehicle from tracking misaligned when the steering reaction force actuator is found to be malfunctioning and when the steering control is changing from a normal steering actuation mode to a backup steering actuation mode.

In view of the forgoing, a vehicle steering system is provided that basically comprises an operation input member, a steering reaction force actuator, a steering mechanism, a clutch and a steering controller. The operation input member is configured to steer a vehicle. The steering reaction force actuator is configured to apply a reaction force to the operation input member. The steering mechanism includes a steering gear unit actuator and at least one steerable vehicle wheel operatively coupled to the steering gear unit actuator. The clutch is arranged between the operation input member and the steerable vehicle wheel to mechanically disconnect the operation input member from the steerable vehicle wheel under normal operating conditions, and to mechanically connect the operation input member with the steerable vehicle wheel upon detecting a malfunction in the steering reaction force actuator. The steering controller is configured to control the steering reaction force actuator and the steering gear unit actuator when the steering reaction force actuator is operating normally, based on operation input information to the operation input member. The steering controller includes a steering malfunction detection section and steering control limiting section. The steering malfunction detection section is configured to detect the malfunction in the steering reaction force actuator. The steering control limiting section is configured to limit control of the steering gear unit actuator from a detection point when the malfunction in the steering reaction force actuator is detected to a clutch engagement point when the clutch is determined to complete mechanical connection between the operation input member and the steerable vehicle wheel.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
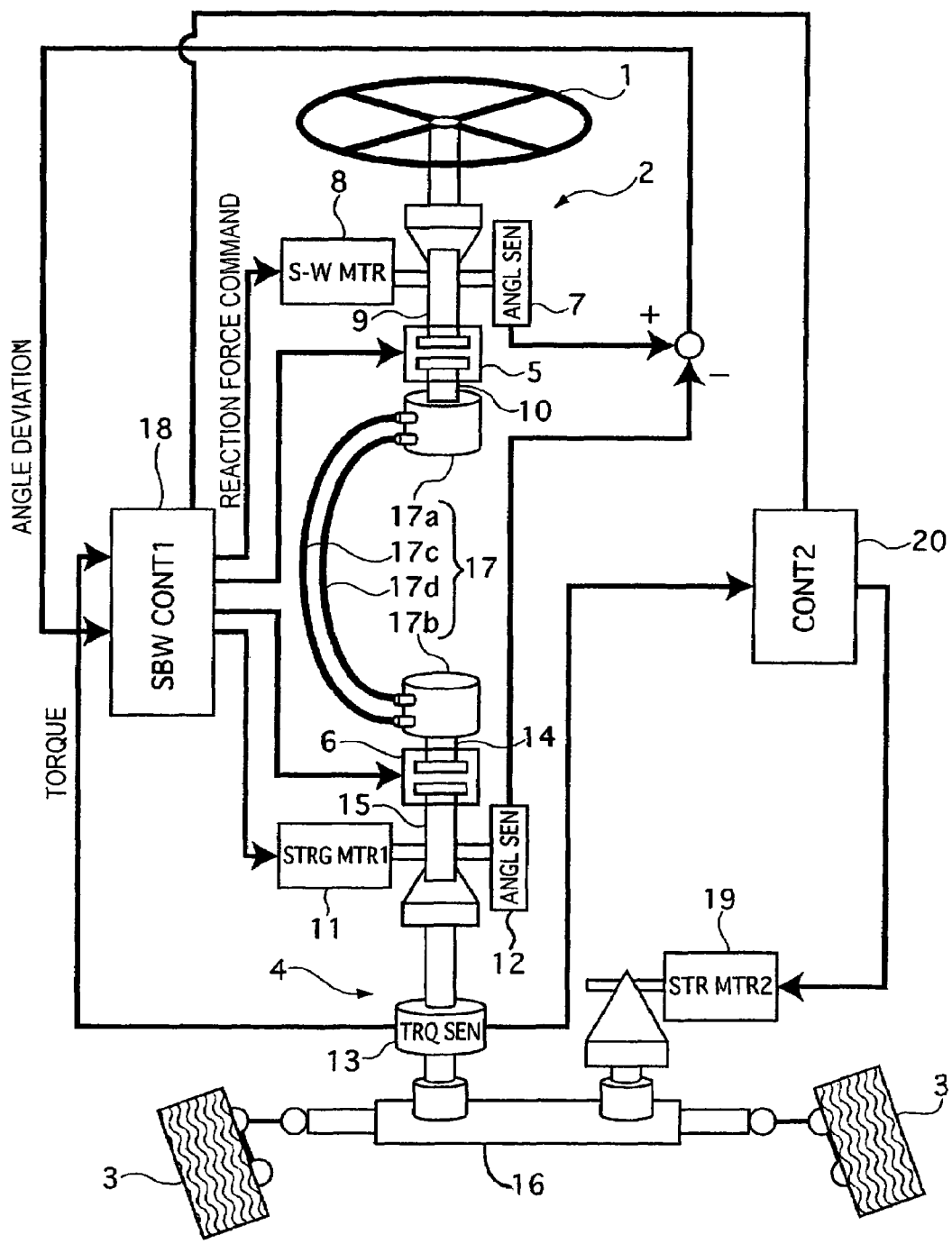
FIG. 1 is an overall view of a vehicle steering system in accordance with a first embodiment of the present invention.

Referring initially to FIG. 1, a vehicle steering system is illustrated in accordance with a first embodiment of the present invention. The vehicle steering system illustrated in FIG. 1 is a steer-by-wire (SBW) system with a backup steering actuation mode. In other words, the vehicle steering system is provided with a primary steer-by-wire steering system and a secondary backup mechanical steering system in which a control system switches from the primary steering system to the backup steering system when a defect or malfunction is determined in the primary steering system.

The vehicle steering system of the present embodiment basically comprises a steering wheel 1 (operation input member), an operation part 2, a pair of steerable vehicle wheels 3, a steering mechanism or turning part 4, a first clutch 5, a second clutch 6, a steering wheel angle sensor 7, a steering reaction force actuator 8, a first steering column shaft 9, a second steering column shaft 10, a steering gear unit actuator 11, a turning angle sensor 12, a torque sensor 13, a first pinion shaft 14, a second pinion shaft 15, a steering gear mechanism 16, a cable mechanism 17, a first steer-by-wire controller 18, a steering gear assisting motor 19, and a second steering assisting controller 20.

The steering wheel 1, the steering wheel angle sensor 7, the steering reaction force actuator 8 are situated at the first steering column shaft 9 of the operation part 2. The first clutch 5 is preferably an electronic magnetic clutch or the like that can be remotely connected and disconnected. The first clutch 5 is situated between the first steering column shaft 9 and the second steering column shaft 10 for selectively connecting and disconnecting the first steering column shaft 9 to and from the second steering column shaft 10.

The steering gear unit actuator 11, the turning angle sensor 12, the torque sensor 13 are situated at the second pinion shaft 15 of the turning part 4. The second clutch 6 is preferably an electronic magnetic clutch or the like that can be remotely connected and disconnected. The second clutch 6 is situated between the first pinion shaft 14 of the turning part 4 and the second pinion shaft 15 of the turning part 4 for selectively connecting and disconnecting the first pinion shaft 14 to and from the second pinion shaft 15.

As explained below, the vehicle steering system of the present invention is configured to make the displacement of the steerable vehicle wheels 3 small and prevent the vehicle from tracking misaligned when a malfunction is found in the steering reaction force actuator 8 and when the control system shifts to the backup steering actuation mode in the period of transition. In particular, as explained below, the control command to the steering gear unit actuator 8 is restricted from the point when the steering reaction force actuator 8 is determined to be malfunctioning to the point when the clutches 5 and 6 are fully engaged, i.e., the clutches 5 and 6 completes to mechanically connect the steering wheel 1 and the steerable vehicle wheels 3.

In the illustrated embodiment, the steering gear mechanism 16 is a rack-and-pinion type of steering mechanism that is operatively coupled to bottom of the second pinion shaft 15 in a conventional manner. The steerable vehicle wheels 3 are situated, so that they can be turned to change the turning angle of the vehicle by shifting a rack gear axis, in both sides of the steering gear mechanism 16.

The cable mechanism 17 is situated between the operation part 2 and the turning part 4. The cable mechanism 17 forms a backup steering mechanism that mechanically couples the operation part 2 and the turning part 4 together when both the clutches 5 and 6 are connected. The cable mechanism 17 has a first cable reel 17a that is coupled to the end of the second steering column shaft 10, and a second cable reel 17b that is coupled to the end of the first pinion shaft 14. The cable mechanism 17 also has a first cable 17c and a second cable 17d operatively connected to the first and second cable reels 17a and 17b. The first and second cables 17c and 17d are each wound in different directions on the first and second cable reels 17a and 17b, in order to operatively connect the operation part 2 and the turning part 4. When a driver rotates the steering wheel 1, this cable mechanism 17 functions as a column shaft by transmitting a steering torque from the steering wheel 1 to the steerable vehicle wheels 3 through the cables 17c and 17c, and transmitting a reaction torque from the steerable vehicle wheels 3 the steering wheel 1.

Both of the clutches 5 and 6 are situated in the middle of the steering system between the steering wheel 1 and the steerable vehicle wheels 3. The steering wheel 1 and the steerable vehicle wheels 3 are mechanically disconnected by releasing both of the clutches 5 and 6 in normal situations. The steering wheel 1 and the steerable vehicle wheels 3 are mechanically connected through the cable mechanism 17 by connecting the clutches 5 and 6.

The first steer-by-wire controller 18 is configured and arranged to receive steering variation information or signals from the steering wheel angle sensor 7 and the turning angle sensor 13 including variation between the steering angle and the turning angle, and torque information or signal from the torque sensor 13. Based on these signals or information, the first steer-by-wire controller 18 is configured and arranged to output a reaction command to the steering reaction force actuator 8, a turning angle command to the steering gear unit actuator 11, and a control command of either connecting or disconnecting to the clutches 5 and 6.

The second steering assisting controller 20 is configured and arranged to receive torque information or signal from the torque sensor 13 and a backup actuation mode information or signal from the first steer-by-wire controller 18. Based on these signals or information, the second steering assisting controller 20 is configured and arranged to outputs a drive assist command to assist steering torque that a driver needs based on the torque information or signal from the torque sensor 13, when the backup actuation mode information is received from the first steer-by-wire controller 18.

The controllers 18 and 20 can be separate units or a single integrated unit that preferably includes a microcomputer with one or more steering control programs that control the vehicle steering system as discussed below. The controllers 18 and 20 can also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the controllers 18 and 20 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Figure 2:
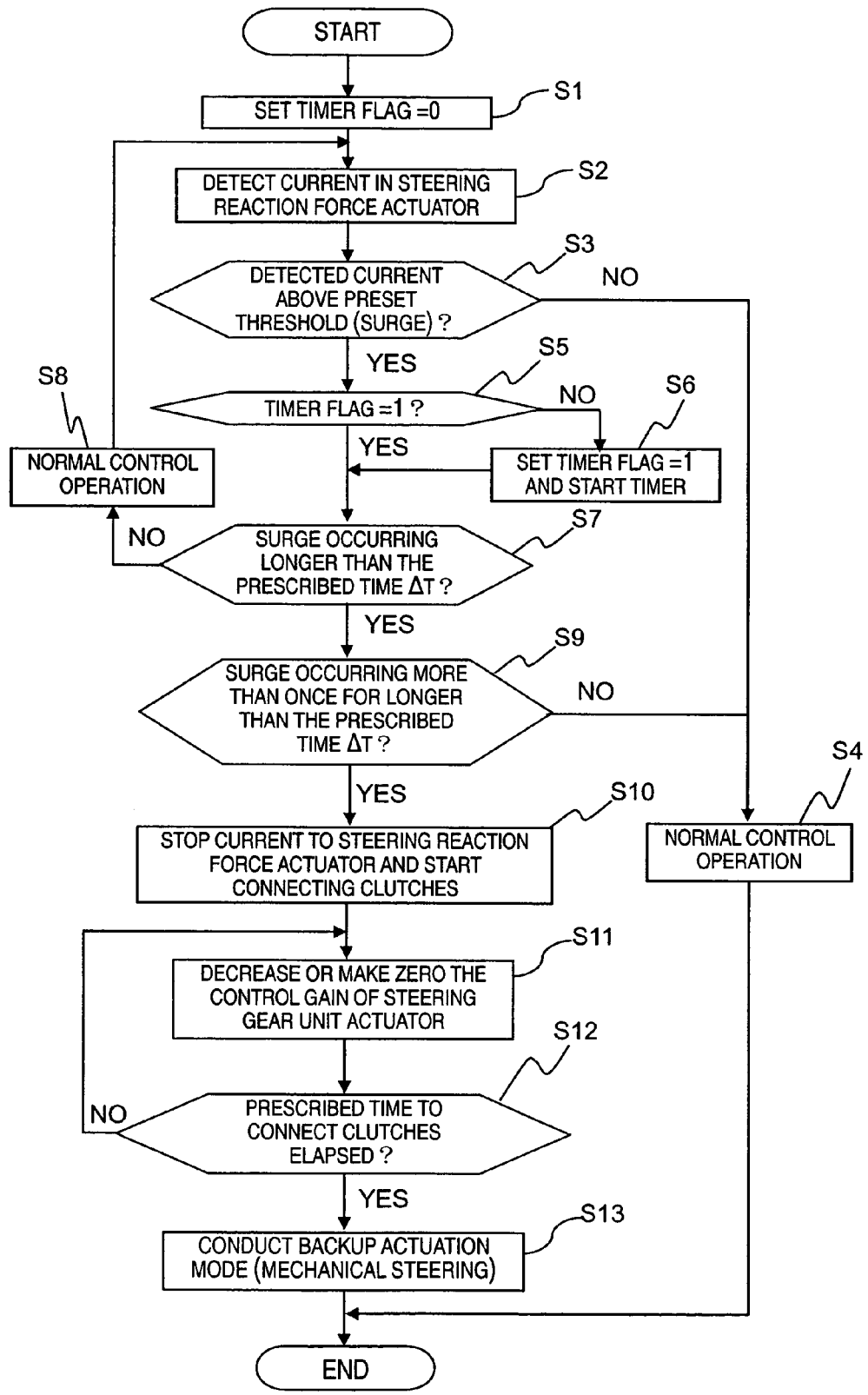
FIG. 2 is a flow chart of the steer-by-wire control processing conducted by the steer-by wire control of the first embodiment of the present invention.

Next, referring to FIG. 2, the steer-by-wire control processing will now be described in accordance with one embodiment of the present invention. In particular, FIG. 2 shows a flow chart for conducting the steer-by-wire control processing by the steer-by-wire controller 18 of the illustrated embodiment. Each of the steps will be described below (steering control method). This control logic is conducted repeatedly in control cycles at predetermined intervals.

In step S1, the steer-by-wire controller 18 sets a timer flag to "0" (Flag=0). As explained below, this timer flag is used to start and stop a timer for determining a length of time that a current surge exists in the steering reaction force actuator 8.

In step S2, the first steer-by-wire controller 18 reads a detected value of the current occurring in the steering reaction force actuator 8. Preferably in step S2, the first steer-by-wire controller 18 filters out the noise when obtaining the detected value of the current in the steering reaction force actuator 8. In other words, the current obtained from the steering reaction force actuator 8 contains noise, and therefore, the detected current is filtered by, for example, using a moving average computation. However, the present invention is not limited to obtaining the detected value of the current by a moving average computation. For example, a noise filter such as a low pass filter can be used instead. Thus, step S2 basically constitutes a steering reaction force actuator current detection method or section of the first steer-by-wire controller 18. Then, the processing proceeds to step S3.

In step S3, the steer-by-wire controller 18 determines whether or not the current in the steering reaction force actuator 8 is surge. If the current in the steering reaction force actuator 8 is surge, then the steer-by-wire controller 18 determines whether or not the current surge is greater than a preset surge threshold. Preferably, defective or malfunction situations of current (surge) in the steering reaction force actuator 8 are confirmed, when the absolute value of the difference between the target current value to the steering reaction force actuator 8 and the real current value obtained by the moving average computation is over the preset surge threshold. If the current surge is lower than the preset surge threshold (No), then the processing proceeds to step S4. However, if the current surge is greater than the preset surge threshold (Yes), then processing proceeds to step S5.

In step S4, the steer-by-wire controller 18 continues conducting the normal control operation of the steering system, i.e., continues with steer-by-wire control, and then moves to the logic end. Here, for example, the normal control operation (steer-by-wire control) refers to a condition where the steer-by-wire controller 18 outputs turning angle commands to the steering gear unit actuator 11 for controlling the turning angle based on signals from the turning angle sensor 12, and outputs reaction force commands to the steering reaction force actuator 8 for providing the steering reaction force based on the reaction torque between the steerable vehicle wheels 3 and the road surface that is detected by the torque sensor 13 when the clutches 5 and 6 are released, e.g., the current being supplied to the clutches 5 and 6.

In step S5, the first steer-by-wire controller 18 determines whether or not the timer flag is set to "1" (Flag=1), i.e., determines whether or not a surge greater than the preset surge threshold was previously detected and the surge timer is running. If the timer flag is set to "0" (Flag=0), i.e., no surge greater than the preset surge threshold was previously detected, then processing proceeds to step S6. However, if the timer flag was set to "1" (Flag=1), i.e., a surge greater than the preset surge threshold was previously detected, then processing proceeds to step S7.

In step S6, the steer-by-wire controller 18 sets the timer flag to "1" (Flag=1), and starts the surge timer to measure the length of time that the surge occurs. Then, the processing by the steer-by-wire controller 18 proceeds to step S7.

In step S7, the steer-by-wire controller 18 determines whether or not the surge is occurs for a period of time that is longer than a prescribed time ΔT. In other words, the steer-by-wire controller 18 determines whether or not there is a malfunction in the steering reaction force actuator 8 by detecting the surge current in the steering reaction force actuator 8. If the steer-by-wire controller 18 determines that the surge is occurring for a period of time that is longer than the prescribed time ΔT (Yes), then the processing continues to step S8. If the steer-by-wire controller 18 determines that the surge is occurring for a period of time that is shorter than the prescribed time ΔT (No), then the processing proceeds to step S8.

In step S8, the steer-by-wire controller 18 continues conducting the normal control operation of the steering system, i.e., continues with steer-by-wire control, as discussed above with reference to step S4. Then, the processing by the steer-by-wire controller 18 proceeds back to step S2, where the current in the steering reaction force actuator 8 is again determined. Thus, the steer-by-wire controller 18 continues in this control loop until the surge level falls below the preset surge threshold as determined in step S3 (No), or until the surge level continues to exist above the preset surge threshold for a period of time that is longer than the prescribed time ΔT as determined in step S7 (Yes).

When the surge level is maintained above the preset surge threshold for a period of time that is longer than the prescribed time ΔT as determined in step S7, then the processing by the steer-by-wire controller 18 proceeds to step S9. In step S9, the steer-by-wire controller 18 counts how many times the preset surge threshold has exceeded for the prescribed time ΔT. In other words, in step S9, the steer-by-wire controller 18 starts a counter for counting the number of consecutive times that the current in the steering reaction force actuator 8 exceeding the preset threshold for the prescribed time ΔT. If a control cycle without detecting a surge occurs after a control cycle in which a surge is detected above the preset surge threshold for the prescribed time ΔT, then the counter in step S9 is reset. Basically, steps S3, S7 and S9 of the control loop constitute a steering malfunction detection method or section of the steer-by-wire controller 18.

While the steer-by-wire controller 18 determines, in step S9 of the illustrated embodiment, a malfunction in the steering reaction force actuator 8 by counting two consecutively control cycles with surges above the preset surge threshold for the prescribed time ΔT, it will be apparent to those skilled in the art from this disclosure that the determination in step S9 is not limited to this situation. For example, step S9 can be eliminated if desired or can be modified so that more than two consecutive surge above the preset surge threshold for the prescribed time ΔT must be detected to proceed to step S10. Also, step S9 can be modified so that if more a predetermined number of surges occur above the preset surge threshold for the prescribed time ΔT (whether consecutive or not) within a prescribed number of control cycles.

In any event, in the illustrated embodiment, if the steer-by-wire controller 18 counts two times consecutively that the current in the steering reaction force actuator 8 exceeding the preset threshold for the prescribed time ΔT in step S9, then the steering reaction force actuator 8 is determined to be defective or malfunctioning in step S9 and the processing by the steer-by-wire controller 18 proceeds to step S10 to start preparing for the back up actuation mode. If the steer-by-wire controller 18 does not count two times consecutively that the current in the steering reaction force actuator 8 exceeding the preset threshold for the prescribed time ΔT in step S9, then the steering reaction force actuator 8 proceeds to step S4 where the steer-by-wire controller 18 continues conducting the normal control operation of the steering system, i.e., continues with steer-by-wire control, as discussed above.

In step S10, the current to the steering reaction force actuator 8 is disconnected based on the determination of a malfunction in the steering reaction force actuator 8 in step S9. At the same time, both the clutches 5 and 6 are connected. Then, the steer-by-wire controller 18 proceeds to step S11. Both of the clutches 5 and 6 are connected when the current is turned off, e.g., current is not being supplied, to the clutches 5 and 6. On the other hand, both of the clutches 5 and 6 are disconnected when the current is turned on, e.g., current is being supplied, to the clutches 5 and 6. Thus, both the clutches 5 and 6 are connected in step S10 by the steer-by-wire controller 18 outputting a command to supply current to the clutches 5 and 6.

In step S11, the first steer-by-wire controller 18 outputs a steering angle command to the steering gear unit actuator 11 such that the control gain decreases or becomes zero. Here, for example, if the control gain is K and the steering angle is θ, then the steering angle command value δ is equal to the product of the control gain K and the steering angle θ, i.e., δ=K*θ. If the control gain K decreases, the steering angle command value δ also becomes smaller. Also, if the control gain K is zero, the steering angle command value δ becomes zero.

In step S12, the first steer-by-wire controller 18 determines whether or not the predetermined time has elapsed for connecting the first and second clutches 5 and 6. If the first steer-by-wire controller 18 determines the predetermined time has elapsed (Yes), then the processing continues to step S13. If in step S12, the first steer-by-wire controller 18 determines the predetermined time has not yet elapsed (No), then the processing proceeds back to step S11. As mentioned above, both of the clutches 5 and 6 are preferably of the types that are connected when current is cut off. For theses types of clutches, there is a mechanical dampening time constant to actually connect after the current is cut off. In other words, these types of clutches only connect after the time lag by the dampening time constant has elapsed. Thus, these types of clutches are not immediately connected after being disconnected. As reference, these types of clutches with electromagnetic coils generally need from about 50 milliseconds to about 100 milliseconds to connect after being disconnected. The predetermined time in step S12 is set to a length of time that is need for both of the clutches 5 and 6 to be connected. For example, the predetermined time in step S12 can be calculated experimentally from data based on experiments that measure the reaction delay time from the current cut off to the completion of the connection.

In step S13, each actuator 8 and 11 moves to the back up actuation mode with the back up actuation, and then the processing proceeds to the logic end. Here, the back up actuation mode is the situation in which both of the clutches 5 and 6 are connected by the current cut off and in which the steering reaction and the turning force are not given. Thus, the back up actuation mode is the situation in which a normal mechanical steering system is used to transmit the steering inputs from the steering wheel 1 to the steerable vehicle wheels 3. Furthermore, by sending commands that the back up actuation mode is "ON" to the second steering assisting controller 20, the motor power steering actuation that provides assist torque to decrease the steering torque that drivers provide is conducted by utilizing the torque sensor 13 and the steering gear assisting motor 19 during the operation at the second steering assisting controller 20.

When the steering reaction force actuator 8 is determined to be operating normally, then the processing proceeds from step S1 to step S2, to step S3 and then to step S4 in the flowchart of FIG. 2 (steer-by-wire control method). At step S4, the normal control operation is conducted using the turning angle control and the steering reaction control such that the steerable vehicle wheels 3 are turned based on the driver's operation of the steering wheel 1.

When the steering reaction force actuator 8 is initially determined as possibly being defective or malfunctioning, then the processing proceeds from step S1 to step S2, to step S3, to step S5, to step S6, to step S7, to step S8 and then back to step S2. This loop continues until the prescribed time ΔT has elapsed as determined by step S7. If the surge did not occur for longer than the prescribed time ΔT (No in step S7), then normal control operation continues. In other words, when the control process loops back from step S7 to step S3, if the surge has stopped before the prescribed time ΔT, the detected current will have fallen below the preset surge threshold and the processing will proceed to step S4 (normal control operation). At step S10, the current to the steering reaction force actuator 8 is cut off, and both the clutches 5 and 6 are connected. At the step S11, the control gain of the steering gear unit actuator 11 decreases or becomes zero. At step S12, the first steer-by-wire controller 18 determines whether or not the predetermined time for connecting the first and second clutches 5 and 6 has elapsed. At step S12, as long as the predetermined time has not elapsed, the processing continues back to step S11. At step S12, if the predetermined time has been determined to have elapsed, then the processing proceeds from step S12 to step S13 and moves to the back up actuation mode.

Therefore, both the clutches 5 and 6 are connected and the steering 1 and the steerable vehicle wheels 3 are connected in defective or malfunctioning situations. This defective or malfunctioning sequence is completed by occurrence of a malfunction in the steering reaction force actuator 8, the needed time to detect a malfunction in the steering reaction force actuator 8, and the connection of the clutches 5 and 6 in chronological order.

When the current is cut off to the steering reaction force actuator 8, the steering wheel 1 rotates freely until both of the clutches 5 and 6 are connected after the detection of a malfunction in the steering reaction force actuator 8. In this case, the steering wheel angle sensor 7 takes the angle data from the steering wheel 1 as a basis for controlling the steering gear unit actuator 11. If the steering gear unit actuator 11 is operated normally, based on the value from the steering wheel angle sensor 7 after the steering reaction force has stopped and the clutches 5 and 6 are not fully engaged, then the steering gear unit actuator 11 will over react.

For this reason, the first steer-by-wire controller 18 responds by decreasing the control gain K or making the control gain K equal to zero after detecting a malfunction in the steering reaction force actuator 8. Thus, the actuation displacement is limited or the value from the steering gear unit actuator 11 is kept the same for certain time until the clutches 5 and 6 are fully engaged right after the detection of a malfunction in the steering reaction force-actuator 8. By doing this, the displacements of the steerable vehicle wheels 3 are limited and an undesirable vehicle behavior can be small.

Figure 3:
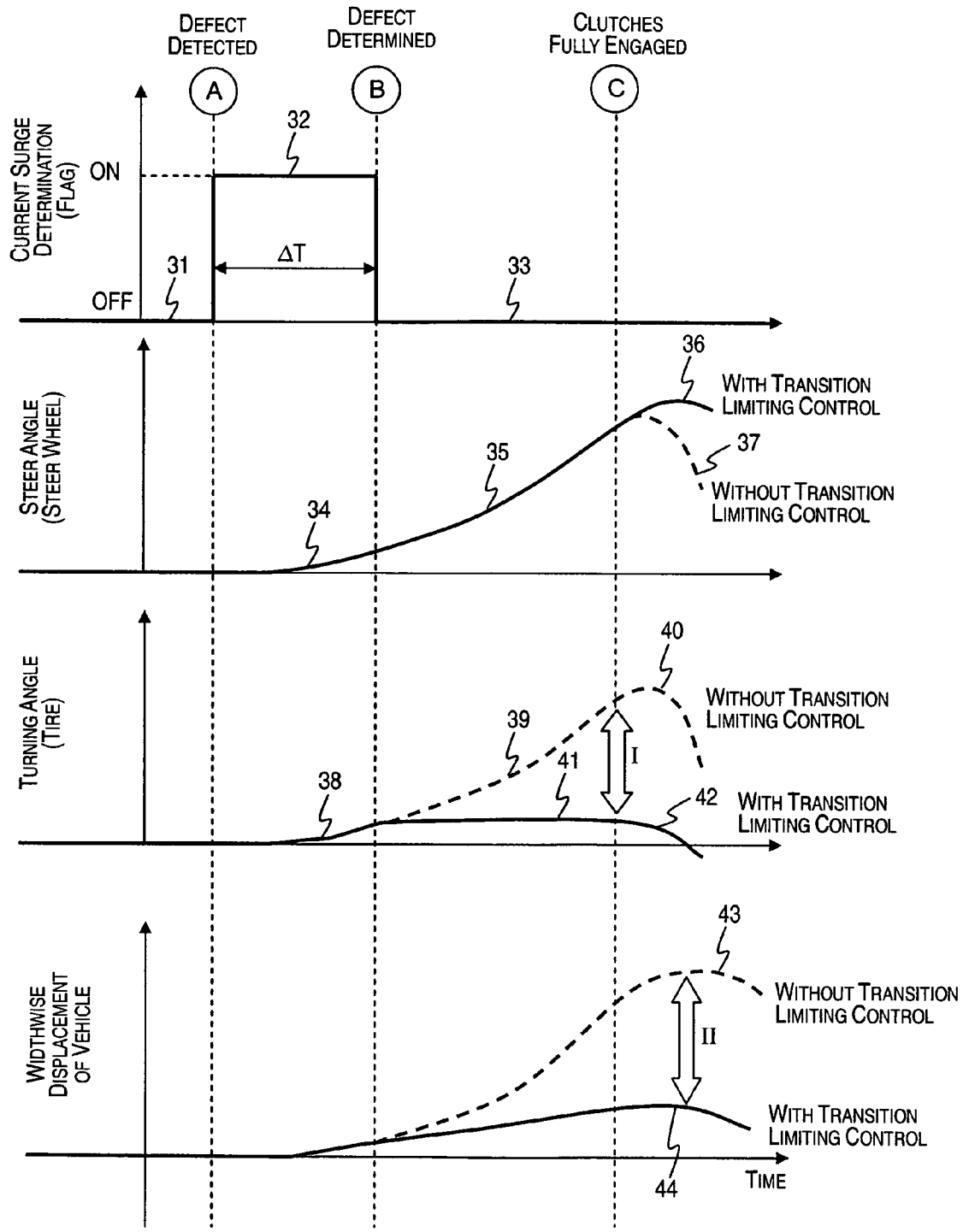
FIG. 3 is four time charts comparing a steering controller operating in accordance with the present invention with a conventional steering controller regarding the current surge, the steering wheel angle, the turning (tire) angle, and the widthwise displacement of the vehicle, when the steering reaction force actuator is malfunctioning.

FIG. 3 illustrates time charts that show the defective or malfunctioning situation of the steering reaction force actuator 8, and that shows control executed by the steer-by-wire controller 18 in chronological order. From the top, FIG. 3 shows the determination of surge, the steering angle (the steering wheel angle), the turning angle (tire angle), and the displacement of the vehicle in the widthwise direction.

As seen in FIG. 3, the point A represents when a surge starts occurring. The end point B represents when a malfunction in the steering reaction force actuator 8 is determined, while the end point C represents when both the clutches 5 and 6 are connected. If the detected surge exceeded a preset surge threshold at the point A, then the surge examination that was off during the period prior to point A as represented by line 31, turns "on" during the period between the points A and B as represented by line 32, such that the steering wheel 1 is kept rotating in one direction by the steering reaction force actuator 8. In time period between the points A and B, the lines 32, 34 and 38 of the time charts represent the influences by the surge on the steering of the vehicle. In this case, because the steering wheel angle sensor 7 identifies the angle of the steering wheel 1, the steering gear unit actuator 11 that is operating normally moves during this time period between the points A and B.

In the time period between the points A and B, when the prescribed time ΔT elapses from the point A to the point B and a malfunction in the steering reaction force actuator 8 is detected, then the current to the steering reaction force actuator 8 is cut off. After that, the current to both of the clutches 5 and 6 is cut off to engage both of the clutches 5 and 6.

In this case, during the time period between the points B and C of FIG. 3, the current to the steering reaction force actuator 8 is cut off as seen by the line 33, and the steering reaction force actuator 8 is not driven. However, because the first steering column shaft 9 is not connected to the second pinion shaft 15 there is not enough outside force to stop the actuation. Therefore, the steering wheel 1 keeps rotating through inertia, as shown by the line 35 in time period between the points B and C of FIG. 3.

If the steer-by-wire controller 18 keeps controlling the steering gear unit actuator 11 in time period between the points B and C, i.e., prior to both of the clutches 5 and 6 being fully connected, then the turning angle of the steerable vehicle wheels 3 will turn, in the same direction as the steering wheel 1 as shown by the line 39 in time period between the points B and C of FIG. 3. In this condition, by decreasing the control gain K of the turning angle or making the control gain K equal to zero on purpose, as shown by the line 41 in time period between the points B and C of FIG. 3, after examining the current surge, the turning angle limits the actuation of the steering wheel 1 during the predetermined time. In other words, if the control command to the steering gear unit actuator 11 is not limited, then the steerable vehicle wheels 3 will be turned too much due to the lack of a reaction force on the steering wheel 1. However, with transition limiting control, the over steering of the steerable vehicle wheels 3 can be minimized.

By using this transition limiting control, as shown by the lines 43 and 44 of time period after the point C, there is large difference in the displacement in widthwise direction between a vehicle going straight with the turning angle limitation conducted and one without the turning angle limitation. The arrow II in FIG. 3 of the time series of displacement in the vehicle's widthwise direction represents the deviation between the displacements in widthwise direction between a vehicle going straight with the turning angle limitation conducted and one without the turning angle limitation. Thus, the steering of the vehicle may behave in an undesirable manner that can be minimized by limiting control of turning angle.

Also, the time period after the point C is a situation where both the clutches 5 and 6 are connected and the steering wheel 1 and the steerable vehicle wheels 3 are fully mechanically connected. However, during this time period after the point C, there is large difference in change in the turning angle as seen by the arrow I. As shown by the lines 40 and 42 and the arrow I, in this time period after the point C, the turning angle is small with the transition limiting control and the turning angle is large without the transition limiting control.

Therefore, without the transition limiting control, as shown by the line 37 in time period after the point C of FIG. 3, the driver need to steer the steering wheel 1 sharply backwards after the back up actuation mode because the turning angle was too large when the steering wheel 1 and the steerable vehicle wheels 3 are not mechanically connected. On the other hand, with the transition limiting control, as shown by the line 36 in time period after the point C of FIG. 3, the operation can be easier after the mechanical back up actuation mode because the turning angle was small when the steering wheel 1 and the steerable vehicle wheels 3 were being connected, so that the driver can steer the steering wheel 1 gently backward with the limited amount of operation to make the vehicle behave in the desired manner.

Next, the some potential effects will be described that can be achieved by the vehicle steering system of the illustrated embodiment. Basically, the present invention relates to a vehicle steering system comprising a primary steering system that applies a steering reaction force to a steering wheel (operation input member) and a steering gear unit controlling a steerable wheel in normal situations, and wherein at least one clutch is disposed in the steering system between the steering wheel and the steerable vehicle wheel, such that the control system engages the at least one clutch and switches to a secondary backup mechanical steering system when a defect or malfunction is determined in the primary steering system. The steering control method of the steering controller 18 conducts control of the drive of the steering reaction force actuator 8 and the steering gear unit actuator 11 in normal situations based on operation input information to the steering wheel 1. The malfunction detection method of the steering controller 18 is configured to detect malfunctions of the steering reaction force actuator 8. The steering control limiting method or section of the steering controller 18 is configured to make, when malfunctions are detected, the vehicle's tracking misalignment small at the transition period by changing from the actuation mode to the backup actuation mode because the steering control limiting method or section of the steering controller 18 limits the control commands from when malfunctions are detected at the steering reaction force actuator 8 to when both the clutches 5 and 6 are connected.

It is possible to prevent mistakes in the malfunction detection of the current surge because the steering malfunction detection method finds that the steering reaction force actuator 8 is malfunctioning when the current surge continues to occur for certain time in the steering reaction force actuator 8.

It is possible to delete the influence of the noise in the current and determine the surge situation precisely because the steering reaction force actuator current detection of step S1 detects current on the steering reaction force actuator 8 and recognize the surge on the steering reaction force actuator 8 when absolute value of the difference between target current to the steering reaction force actuator 8 and the real current by moving average of the detected steering reaction force actuator current exceeds a predetermined threshold.

Moreover, it is possible to precisely detect the malfunction of the steering actuator 8 early because the malfunction detection method counts the number of surges exceeding the predetermined threshold and recognizes a malfunction when it counts two consecutive surges.

Also it is possible to facilitate the operation right after the mechanical backup actuation by making the turning angle of the steerable vehicle wheels 3, that needs to back up, small immediately after the malfunction detection in the steering reaction force actuator 8 because the steering controller 18 stops current to the steering reaction force actuator 8, when a malfunction is found in the steering reaction force actuator 8, and then the steering control limiting method or section of the steering controller 18 limits the control commands by decreasing the control gain K to the steering reaction force actuator 8, or making the control gain K equal to zero, the steering wheel 1 and the steerable vehicle wheels 3 are connected before by the clutches 5 and 6.

It is also possible to diminish the burden of the driver in the backup actuation mode after a malfunction because the steering gear mechanism 16 of the turning part 4 has an assisting motor 19 and the steering controller 18 shifts to a motor power steering assist mode after an operation input member and the steerable vehicle wheels 3 are connected by a backup actuation based on a malfunction detection of the steering reaction force actuator 8.

The present invention was described above on the basis of the illustrated embodiment, but the present invention is in no way limited to the embodiment. The structure can be modified or added new features as long as they do not change the main concept of the claims of the present invention.

For example, the illustrated embodiment shows the system where each one of the steering part and the turning part has an actuator, but the present invention also applies to a steering system where each one of the steering part and the turning part has at least one actuator.

The illustrated embodiment shows the two clutch mechanisms (mechanically joining parts) and the cable mechanism (mechanical backup mechanism) in the steering system. However, for example, the present invention includes a situation where only one clutch exists. Thus, the present invention can include any mechanical joint that connects and disconnects the steering wheel and the wheels as a backup mechanism so long as the steering wheel is rigidly connected to the steerable wheels to directly transmit the rotation of the steering wheel to the steerable wheels. The illustrated embodiment shows a system combining an SBW system and an electric power steering system, but a system without an electric power system is still acceptable. For example, a system with a hydraulic power steering system can be used instead an electric power steering system.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-209393. The entire disclosure of Japanese Patent Application No. 2003-209393 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle steering system comprising:
   an operation input member configured to steer a vehicle;
   a steering reaction force actuator configured to apply a reaction force to the operation input member;
   a steering mechanism including a steering gear unit actuator and at least one steerable vehicle wheel operatively coupled to the steering gear unit actuator;
   a clutch arranged between the operation input member and the steerable vehicle wheel to mechanically disconnect the operation input member from the steerable vehicle wheel under normal operating conditions, and to mechanically connect the operation input member with the steerable vehicle wheel upon detecting a malfunction in the steering reaction force actuator; and
   a steering controller configured to control the steering reaction force actuator and the steering gear unit actuator when the steering reaction force actuator is operating normally, based on operation input information to the operation input member, the steering controller including
      a steering malfunction detection section configured to detect the malfunction in the steering reaction force actuator, and
      a steering control limiting section configured to limit control of the steering gear unit actuator from a detection point when the malfunction in the steering reaction force actuator is detected to a clutch engagement point when the clutch is determined to complete mechanical connection between the operation input member and the steerable vehicle wheel.

2. The vehicle steering system according to claim 1, wherein
   the steering malfunction detection section is further configured to detect that the steering reaction force actuator is malfunctioning when a current surge continues to occur for a predetermined amount of time in the steering reaction force actuator.

3. The vehicle steering system according to claim 2, wherein
   the steering malfunction detection section is further configured to detect an actual current in the steering reaction force actuator as the current surge in the steering reaction force actuator when an absolute value of a difference between a target current of the steering reaction force actuator and the actual current exceeds a predetermined threshold by using moving average of the actual current in the steering reaction force actuator.

4. The vehicle steering system according to clam 3, wherein
   the steering malfunction detection section is further configured to count a number of times the current surge occurs that exceeds the predetermined threshold and determine the malfunction upon detecting two consecutive occurrences of the current surge that exceeds the predetermined threshold.

5. The vehicle steering system according to claim 4, wherein
   the steering controller is further configured to stop current to the steering reaction force actuator, upon determining the steering reaction force actuator is malfunctioning, and then steering control limiting section is further configured to limit a control command by decreasing a control gain to the steering gear unit actuator, or making the control gain equal to zero, before the operation input member and the steerable vehicle wheel are connected by the clutch.

6. The vehicle steering system according to claim 5, wherein
   the steering mechanism further includes an assisting motor; and
   the steering controller is further configured to shift in a motor power steering mode after the operation input member and the steerable vehicle wheel are connected based on detecting the malfunction in the steering reaction force actuator.

7. The vehicle steering system according to claim 1, wherein the steering malfunction detection section is further configured to detect an actual current in the steering reaction force actuator as the current surge in the steering reaction force actuator when an absolute value of a difference between a target current of the steering reaction force actuator and the actual current exceeds a predetermined threshold by using moving average of the actual current in the steering reaction force actuator.

8. The vehicle steering system according to claim 7, wherein
the steering malfunction detection section is further configured to count a number of times the current surge occurs that exceeds the predetermined threshold and determine the malfunction upon detecting two consecutive occurrences of the current surge that exceeds the predetermined threshold.

9. The vehicle steering system according to claim 1, wherein
the steering controller is further configured to stop current to the steering reaction force actuator, upon determining the steering reaction force actuator is malfunctioning, and then steering control limiting section is further configured to limit a control command by decreasing a control gain to the steering gear unit actuator, or making the control gain equal to zero, before the operation input member and the steerable vehicle wheel are connected by the clutch.

10. The vehicle steering system according to claim 1, wherein
the steering mechanism further includes an assisting motor; and
the steering controller is further configured to shift in a motor power steering mode after the operation input member and the steerable vehicle wheel are connected based on detecting the malfunction in the steering reaction force actuator.

11. A vehicle steering system comprising:
operation input means for steering a vehicle;
a steering reaction force means for applying a reaction force to the operation input means;
a steering means for turning at least one steerable vehicle wheel;
a connection means for mechanically disconnecting the operation input means from the steerable vehicle wheel under normal operating conditions, and for mechanically connecting the operation input means with the steerable vehicle wheel upon detecting a malfunction in the steering reaction force means; and
a steering controlling means for controlling the steering reaction force means and the steering means when the steering reaction force means is operating normally, based on operation input information to the operation input means, the steering controlling means being configured to detect the malfunction in the steering reaction force means, and to limit control of the steering gear unit means from a detection point when the malfunction in the steering reaction force means is detected to an engagement point when the connection means is determined to complete mechanical connection between the operation input means and the steerable vehicle wheel.

12. A method of controlling a vehicle steering system comprising:
applying a reaction force to an operation input member under normal operating conditions;
monitoring a steering reaction force actuator that applies the reaction force to the operation input member for a malfunction;
mechanically disconnecting the operation input means from a steerable vehicle wheel when the steering reaction force actuator is operating normally such that the steerable vehicle wheel is turned by control of a steering gear unit actuator;
mechanically connecting the operation input member with the steerable vehicle wheel upon detecting the steering reaction force actuator is malfunctioning; and
controlling the steering reaction force actuator and steering gear unit actuator upon detecting the malfunction in the steering reaction force actuator such that a control command to the steering gear unit actuator is limited from a detection point when the malfunction in the steering reaction force actuator is detected to an engagement point when complete mechanical connection between the operation input member and the steerable vehicle wheel is determined.

* * * * *